United States Patent
Yang et al.

(10) Patent No.: US 10,168,196 B2
(45) Date of Patent: Jan. 1, 2019

(54) IMMERSION-TYPE ONLINE MULTIPHASE MEASURING INSTRUMENT AND METHOD

(71) Applicants: INSTITUTE OF PROCESS ENGINEERING, CHINESE ACADEMY OF SCIENCES, Beijing (CN); Nanjing Jiuzhang Chemical Technology Co., Ltd., Jiangsu (CN)

(72) Inventors: Chao Yang, Beijing (CN); Xiangyang Li, Beijing (CN); Shifang Yang, Beijing (CN); Guanqi Wang, Beijing (CN); Zaisha Mao, Beijing (CN)

(73) Assignee: INSTITUTE OF PROCESS ENGINEERING, CHINESE ACADEMY OF SCIENCES (CN)

( * ) Notice: Subject to any disclaimer, the term of this patent is extended or adjusted under 35 U.S.C. 154(b) by 122 days.

(21) Appl. No.: 15/368,769

(22) Filed: Dec. 5, 2016

(65) Prior Publication Data

US 2017/0299415 A1     Oct. 19, 2017

(30) Foreign Application Priority Data

Apr. 19, 2016 (CN) .......................... 2016 1 0245332

(51) Int. Cl.
*H04N 7/18* (2006.01)
*G01F 1/708* (2006.01)
*H04N 5/225* (2006.01)
*G01F 1/74* (2006.01)

(52) U.S. Cl.
CPC ......... *G01F 1/7086* (2013.01); *H04N 5/2256* (2013.01); *H04N 7/185* (2013.01); *G01F 1/74* (2013.01)

(58) Field of Classification Search
CPC .......................... G01F 1/7086; H04N 5/2256
USPC ............................................................ 348/84
See application file for complete search history.

(56) References Cited

U.S. PATENT DOCUMENTS

2011/0310270 A1* 12/2011 Gladnick ........... G01N 21/8806
                                                                  348/229.1
2013/0057675 A1*  3/2013 Jaaskelainen ............. G01P 5/22
                                                                       348/84

* cited by examiner

*Primary Examiner* — Richard T Torrente
(74) *Attorney, Agent, or Firm* — McDonald Hopkins LLC (57) ABSTRACT

Provided are an immersion-type online multiphase measuring instrument and method. The instrument includes a package tube; a viewport; LED lamps and a brightness-adjustable light source system including a power supply, a signal generator and an oscilloscope; a telecentric lens and an image sensor; a controller; a signal processing and outputting system; and a display system. The LED lamps, the telecentric lens and the image sensor are located in the package tube. The exposure period of the image sensor is less than the pulse period of the signal generator. The photographic probe used in this measuring instrument has the advantages of online quantitative measurement, small size, portability, less-impact of fluid temperature and the surrounding environment, adaptability to transparent and opaque reactors with two-phase, three-phase and more than three-phase.

18 Claims, 5 Drawing Sheets

IMMERSION-TYPE ONLINE MULTIPHASE MEASURING INSTRUMENT AND METHOD

The present application claims priority to and the benefit of Chinese Patent Application No. 201610245332.5 filed on Apr. 19, 2016, the entire disclosure of which is incorporated herein by reference in its entirety.

TECHNICAL FIELD

The present invention relates to a physical measuring equipment, specially to an immersion-type online multiphase measuring instrument and method applied for multiphase reactors.

BACKGROUND ART

In industrial chemical reactors, complicated processes including flow, mixing, dispersion, transfer and reaction of several different phases are always involved. Size, concentration, and velocity distributions of bubbles, droplets or solid particles are the most direct and effective indexes reflecting the internal characteristics of reactors and they are also the key parameters for the analysis, selection, design and scale-up of multiphase reactors.

At present, various probe methods are most commonly used based on optical fiber reflex or conductance (capacitance). Both methods have been applied successfully in the study of gas-liquid and liquid-solid systems, for example, the monofilament capacitance probe measurement system of phase containing rate and phase interface in multiphase pipe flow (CN 1865966A) and the measurement method and device of the two-phase flow parameter based on the double capacitance probe (CN 101413911A). However, both of them have some limits. Multiphase flow to be measured should be conductive for the conductance probe, while the fiber optic probe is very easy to be broken. Signals will interfere with each other when there are two or more dispersed phases. In addition, there are ultrasonic tomography, gamma ray tomography, electronic tomography technology, etc. The major advantage is non-intrusive, but they cost too much and their resolutions of time and space still need to be improved.

Optical photography including non-invasive and invasive photography is the most intuitive measuring method. The outstanding advantage of non-intrusive photography is that it does not interfere with the flow field. And its shortcomings are that the measured reactors must be transparent or installed with viewports, and the holdup of bubbles or solid particles must be lower. Invasive photography such as optical fiber endoscope can be directly inserted into the reactor for online measurement. But the measurement accuracy is limited by the fiber diameter. At the same time, the wide-angle lens installed at the front end of the endoscope will cause a larger image distortion.

The prominent advantage of a telecentric lens is that the image is almost no distortion (for example, its distortion coefficient is less than 0.1% compared to 1-2% of a regular wide-angle lens). An image measuring device (CN 203405417U) in two-phase flow in a pipeline was disclosed, in which the droplets to be measured are illuminated by a lighting source through a transparent pipe or a viewport. Surface of the liquid film is illuminated by a laser source, and images of drops or liquid film of the area to be measured are obtained by a telecentric lens and a CCD or a CMOS image sensor. The droplet image out of the lens depth of field by comparing defocus radius of a single droplet image with allowable dispersion circle size of measurement system is removed; particle size, velocity and movement direction from the particle images within the depth of field are extracted, and the droplet size and velocity distribution, and the average concentration and average volume flow rate during statistical time are obtained by statistics on a large number of droplets within the depth of field in the measured region; the film thickness based on the distance between surface and wall in film image are determined.

Although the device has solved the problem of image distortion, it has the shortcomings of non-intrusive optical photography mentioned above and strict requirements on reactors to be measured.

Invasive telecentric imaging may solve the shortcomings existing in the above technology, but some technical problems still need to be overcome: (1) invasive telecentric probe should be long enough to measure anywhere of the multiphase reactors; (2) light intensity will reduce when propagated through fluid medium in the multiphase reactor, and adequate illumination is necessary to make sure the exposure enough in the process of photographing; and (3) it is necessary to clearly capture the image of the high-speed moving particles, as the fluid in the multiphase reactor is in high speed. In addition, the probe size should be as small as possible not to disturb the flow field.

DISCLOSURE OF THE INVENTION

The aim of the present invention is to provide an immersion-type online multiphase measuring instrument and method applied for multiphase reactors. Sharp pictures of local flow fluid inside multiphase reactors can be captured by this measuring instrument, and distributions of concentration, diameter and velocity of bubbles, droplets or solid particles of multiphase flow in high speed can be obtained by professional image processing software, resulting in real time and online measurement of multiphase reactors.

The present invention applies the following technical scheme to realize this purpose.

An immersion-type online multiphase measuring instrument includes:
 a package tube;
 a viewport, sealedly installed at the front end of the package tube;
 an illumination system for illuminating multiphase flow, including LED lamps and a brightness-adjustable light source connected with the LED lamps, which comprises a power supply, a signal generator and an oscilloscope;
 a photographic system for taking pictures, including a telecentric lens and an image sensor;
 a controller connected with the signal generator and the image sensor;
 a signal processing and outputting system connected with the image sensor; and
 a display system connected with the signal processing and outputting system.

The LED lamps, the telecentric lens and the image sensor are located in the package tube and the exposure period of the image sensor is greater than the pulse period of the signal generator, controlled by the controller.

The brightness, the color and the pulse period of the LED lamps can be controlled by selecting the power supply, adjusting the signal generator and the oscilloscope in the brightness-adjustable light source. The image sensor and the brightness-adjustable light source can realize the synchronization of pulse illumination and photographic by adjusting to match the pulse period of light source and the exposure period of the image sensor. The most suitable brightness, color and pulse period of LED lamps can be adjusted according to the definition of the image obtained by many times, until the image definition is the highest, which can meet the requirements.

The immersion-type online multiphase measuring instrument for measuring fluid state in multiphase reactors, is insensitive to fluid temperature and the surrounding environment, and has adaptability to transparent and opaque reactors with two-phase and three-phase and even more three-phase.

The work distance of the telecentric lens is 250-550 mm in order that the probe can achieve everywhere in the multiphase reactor, such as 260 mm, 300 mm, 350 mm, 380 mm, 420 mm, 470 mm, 550 mm and so on, and the depth of field is 1-3.7 mm, such as 1.2 mm, 1.5 mm, 1.8 mm, 2.0 mm, 2.2 mm, 2.5 mm, 2.8 mm, 3.0 mm or 3.5 mm and so on.

In order to disturb the flow field as less as possible, the magnification of the telecentric lens can be abandoned a little. Preferably, the magnification of the telecentric lens is 0.5-1 time, such as 0.6 times, 0.7 times, 0.8 times or 0.9 times.

The external diameter of the telecentric lens is 19-25 mm, such as 20 mm, 21 mm, 22 mm, 23 mm or 24 mm, etc.

The image sensor is a CCD camera or a CMOS camera.

The exposure time of the CCD camera or CMOS camera is less than or equal to 1 ms, such as 0.1 ms, 0.5 ms, 1 ms and so on. The resolution of it is 5-15 μm, such as 10 μm, 12 μm, 14 μm, 15 μm, and so on. The number of pixels in length and width is at least 800×600, such as 2560×1920, 2048×1536, 1600×1200, 1280×1024, 800×600 and so on. The frame frequency is at least 60 fps, such as 60 fps, 100 fps, 150 fps, 200 fps, 1000 fps and so on.

The LED lamps are inside the package tube, while the brightness-adjustable light source is outside. Pulse light with various wavelengths for different multiphase systems is obtained by adjusting the light source. The number of the LED lamps is at least 12, such as 12, 16, 20, 24 and so on.

The LED lamps are evenly arranged circularly in the package tube, preferably. The internal diameter of the circular LED lamps should be as small as possible in the premise of the brightness.

The LED lamps are linked with the brightness-adjustable light source through wires.

The package tube is composed of a front tube and a back tube with different diameters.

The external diameter of the front tube is 25-30 mm, such as 25 mm, 26 mm, 28 mm and so on, and the length is 300-600 mm, such as 320 mm, 350 mm, 400 mm, 450 mm, 500 mm, 550 mm, 600 mm and so on. Specific size of the front tube can be determined according to the parameters of the selected telecentric lens by one skilled in the art.

The external diameter of the back tube is 50 mm, and the length is 50 mm. Specific size of the back tube can be determined according to the size of the selected image sensor by one skilled in the art.

The material of the package tube is stainless steel.

The viewport, LED lamps and telecentric lens are packaged in the front tube. The viewport is arranged on the end of the front tube away from the back tube, followed by the LED lamps and telecentric lens and the image sensor (CCD or CMOS camera) is packaged in the back tube.

The viewport is made up of a piece of circular glass coated by antireflection film inside, which can make sure the light transmittance over 95%.

The image sensor and the controller are connected by a high-speed data line to realize high speed transmission of the image.

The display system comprises a LED screen. It is used to display a signal received from a signal processing and outputting system.

The signal processing and outputting system, the controller and the display system are integrated into a computer. The computer can realize the functions of the signal processing and outputting system, controller and display system.

The present invention also provides a method of using the above online multiphase measuring instrument for measuring the state of multiphase flow. The method is: the immersion-type online multiphase measuring instrument is arranged in a multiphase flow reactor; then photography are conducted using the illumination system and the photographic system synchronously to obtain the image information of local flow in multiphase flow reactor; at last, the image information is analyzed using an image analysis software and the state information of the multiphase flow at the front face of the immersion-type online multiphase measuring instrument is obtained.

The image analysis software is Plus Image-Pro software.

Compared with the prior technologies, the present invention has the following beneficial effects:

The present invention provides an immersion-type online measuring instrument applied for multiphase reactors. With a small volume, the measuring instrument is movable, immune to fluid temperature (below 100° C.; limited by the materials of the telecentric lens and the image sensor, and sealant), electric field and magnetic field of surroundings. It is applicable for the measurement of solid, droplets or bubbles in two-phase systems, the upper limit of the concentration of which is about 60%. That is limited by the size of particles and the optical path length. The instrument is also applicable for multiphase flow of different dispersed particles with two or more species, and for reactors of large volume and opaque. Particle nature of steady state and unsteady state in multiphase reactors can be measured in real-time, quantitatively and intuitively by taking pictures continuously.

BRIEF DESCRIPTION OF THE DRAWINGS

As shown in FIG. 1, "1" is a viewport, "2" is LED lamps, "3" is a stainless steel package tube, "4" is a telecentric lens, "5" is a minisize high speed CMOS camera, "6" is a brightness-adjustable light source, "7" is a wire, "8" is a USB3.0 data line, "9" is a high speed image acquisition card, and "10" is a sampling computer.

EMBODIMENTS

Further description of the technical scheme is as follows by specific examples combining with the drawings.

Example 1

Figure 1:
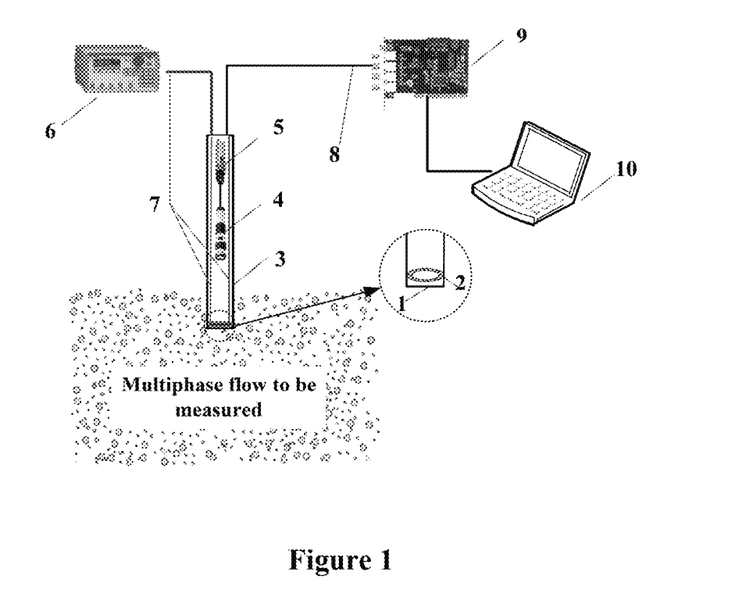
FIG. 1 is a schematic drawing of the structure of the immersion-type online multiphase measuring instrument provided in Example 1 according to the present invention.

A schematic drawing of an immersion-type online multiphase measuring instrument for multiphase reactors is shown in FIG. 1. The structure of the instrument is described as below.

A stainless steel package tube 3;
a viewport 1, sealedly installed at the front end of the stainless steel package tube 3;
an illumination system for illuminating multiphase flow, including LED lamps 2 and a brightness-adjustable light source connected with the LED lamps 2, which comprises a power supply, a signal generator and an oscilloscope;
a photographic system for taking pictures, including a telecentric lens 4 and an image sensor; the image sensor is a high speed CMOS camera 5;
a controller connected with the signal generator and the image sensor;
a signal processing and outputting system connected with the image sensor; and
a display system connected with the signal processing and outputting system.

The LED lamps, the telecentric lens and the image sensor are located in the stainless steel package tube; the brightness-adjustable light source, the controller, the signal processing and outputting system and the display system are located outside the stainless steel package tube; and the exposure period of the image sensor is greater than the pulse period of the signal generator, controlled by the controller.

The signal processing and outputting system, the controller and the display system are integrated into a sampling computer 10.

Specifically, the first element is a viewport 1, which is a piece of circular sapphire glass coated by antireflection film. Twenty LED lamps 2 are arranged uniformly behind the viewport 1, which composes a ring. A telecentric lens 4 is installed behind the LED lamps 2, and the parameters are listed as: the magnification is 1; both vision fields of objects and images are φ 8 mm; the work distance is 250 mm; the telecentricity is less than 0.1°; the depth of field is 2.1 mm; the resolution is 14.3 μm and the optical aberration is less than 0.12%. A work distance is between the outside surface of the viewport (1) and the front side of the telecentric lens 4, in order to take sharp pictures. A standard C port connects the telecentric lens 4 to the high speed CMOS camera 5. Parameters of the CMOS are that the resolution is 1280× 1024, the colors are monochrome, the frame rate is 150 fps and a USB 3.0 is applied. The viewpoint 1, the LED lamps 2, the telecentric lens 4 and the high-speed CMOS camera 5 are packaged inside the stainless steel package tube 3. A brightness-adjustable light source 6 is configured outside of the measuring instrument, connecting to the LED lamps 2 by a wire (7). The telecentric lens 4 connects to the sampling computer 10 by a USB3.0 data line (8), and the computer is equipped with high speed image acquisition card.

Figure 2:
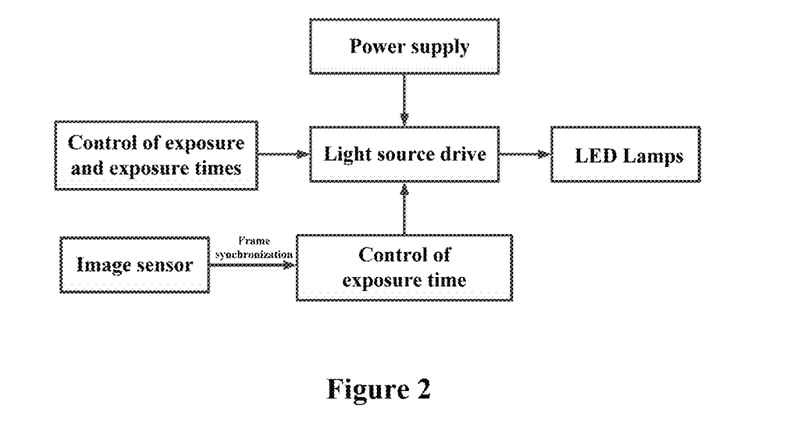
FIG. 2 is a synchronization control mode of lighting flash and CMOS camera provided in Example 1.

In order to obtain a clear image by such an instrument, the way to control the synchronization of LED lamps flashing and CMOS camera is shown in FIG. 2: opening source switch, then setting the intensity and period of pulse light by the light source driver; next, setting the exposure time, light balance, frame rate and gain to match the pulse period of the illumination signal and the exposure time of the image sensor (the exposure period of the image sensor is greater than the pulse period of the signal generator) by the controller in computer. Thus, the synchronization of pulse light and image capturing is realized.

Example 2

Velocity distribution of solid particles in liquid-solid system is measured by the immersion-type online multiphase measuring instrument, which was described in Example 1.

The experiment was carried out in an elliptical-bottom plexiglass stirred tank with an inner diameter of T=280 mm stirred by a six-leaf pitched-blade turbine with a diameter of D=T/3 with 4 standard baffles (the baffle width B=T/10). The turbine height off bottom is C=T/3. The impeller speed is 480 rpm. Static liquid height is H=1.2T. The average solid holdup (volume ratio) is 0.01. The measured points are at r=0.025, 0.045, 0.065, 0.085, 0.105, 0.125 m, and z=0.045, 0.090, 0.135, 0.180, 0.220, 0.260, 0.300 m.

Figure 3:
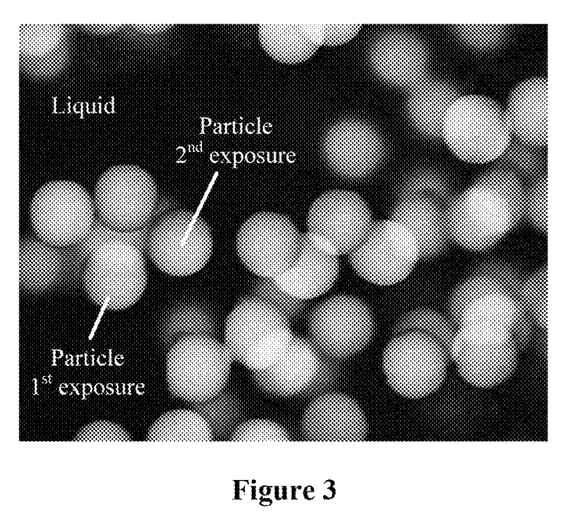
FIG. 3 is a double-exposure image of the liquid-solid system provided in Example 2.
Figure 4:
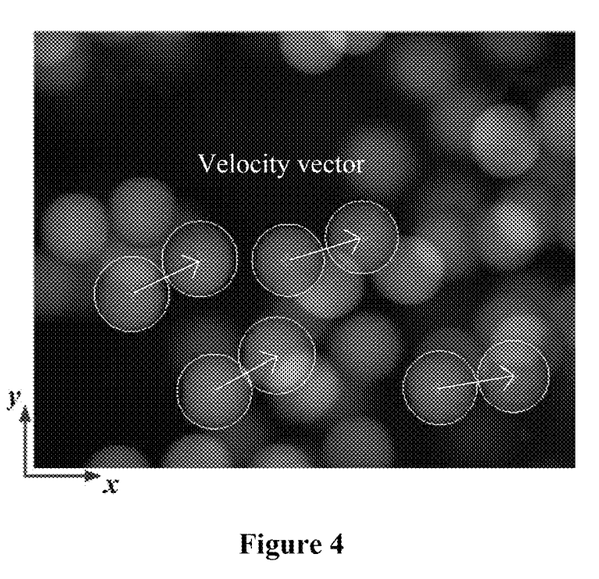
FIG. 4 is a processed result of the double-exposure image in FIG. 3.

The measuring method includes the following steps:
(1) the online multiphase measuring instrument is placed in a multiphase reactor; the exposure time $t_1$ of the image sensor and the pulse period $t_2$ of the signal generator are controlled to meet the condition $t_1 > 2t_2$, and a double-exposure particle image is obtained, as shown in FIG. 3;

(2) the actual size of individual pixel in the image is calibrated using a graduated ruler with an accuracy of 0.1 mm scale;

(3) valid particles are determined using the following steps: first, the focal plane position of the telecentric lens is determined; then, the object to be measured is respectively arranged on the front of the package tube, the l/2 positions ahead of or behind the focal plane, where l is the telecentric lens depth of field (mm); the object to be measured is photographed by the online multiphase measuring instrument, and the image of the object is obtained and the gray gradient $Grad(\Phi_{l/2})$ around the boundary of the object is determined, where $\Phi_{l/2}$ is the gray value at the ±l/2 positions ahead of or behind the focal plane; if $Grad(\Phi)$ is greater than or equal to $Grad(\Phi_{l/2})$, the particle is labeled as a valid one; and (4) the double-exposure image of the same valid particle is identified using a particle matching algorithm; the lower left corner of the particle image is set as coordinate origin; in accordance with the order "binarization, interception of part of the area and centroid extraction", the centroid coordinates $(m_{t,i}, n_{t,i})$ and $(m_{t+\Delta t,i}, n_{t+\Delta t,i})$ are read; then the centroid coordinates are conversed to the actual length of the coordinates $(x_{t,i}, y_{t,i})$ and $(x_{t+\Delta t,i}, y_{t+\Delta t,i})$ using the actual size of individual pixel obtained in step (2), so the instantaneous velocity of particles is calculated by:

$$V_i = \frac{\sqrt{(x_{t+\Delta t,i} - x_{t,i})^2 + (y_{t+\Delta t,i} - y_{t,i})^2}}{\Delta t},$$

where $\Delta t$ is the time interval between twice exposures.

Figure 5:
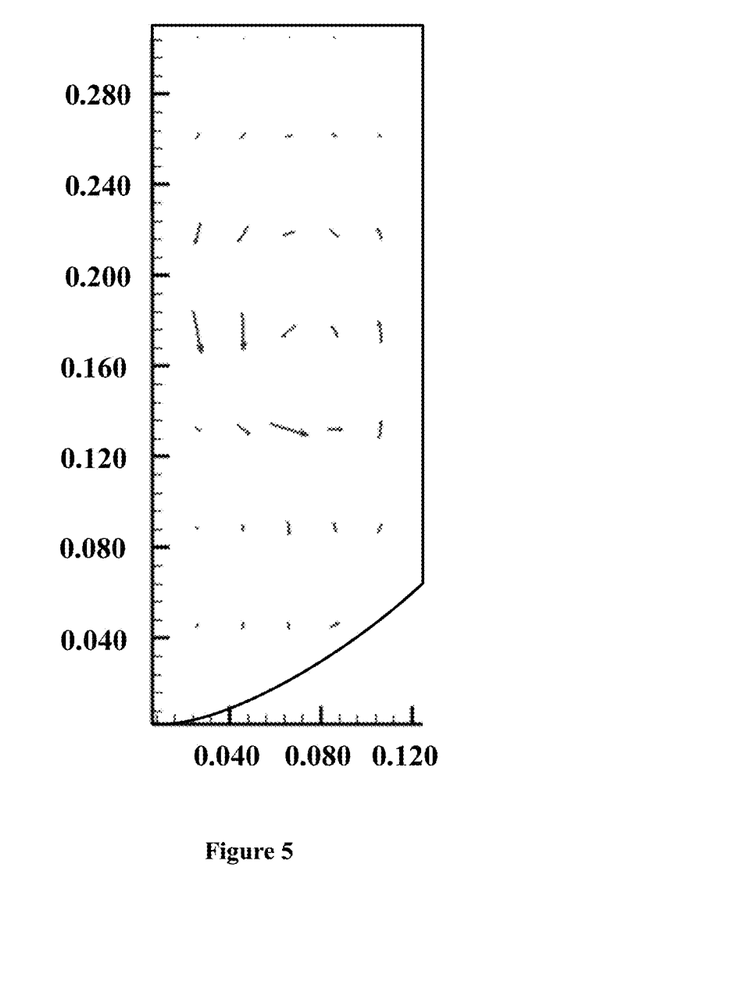
FIG. 5 is a velocity profile of the solid particle obtained by the measuring method of particle velocity in Example 2.

According to the analysis of nearly 4000 particles, the velocity distribution of solid particles in liquid-solid system is shown in FIG. 5. Compared to the CFD simulation of the invasive error analysis, all of the errors of measuring results are less than 15%.

Example 3

The particle diameter distribution of solid particles and bubbles in a gas-liquid-solid three-phase stirred tank is measured by the immersion-type online multiphase measuring instrument, which is described in Example 1.

The experiment is carried out in the stirred tank. The solid particles are white plastic beads with a diameter of about 1 mm, and the average solid holdup (volume ratio) is 0.01. The measuring point is at r=0.07 m and z=0.055 m. The air is vented by the annular gas distributor at a rate of flow of 800 L/h. The impeller speed is set as 480 rpm.

Figure 6A:
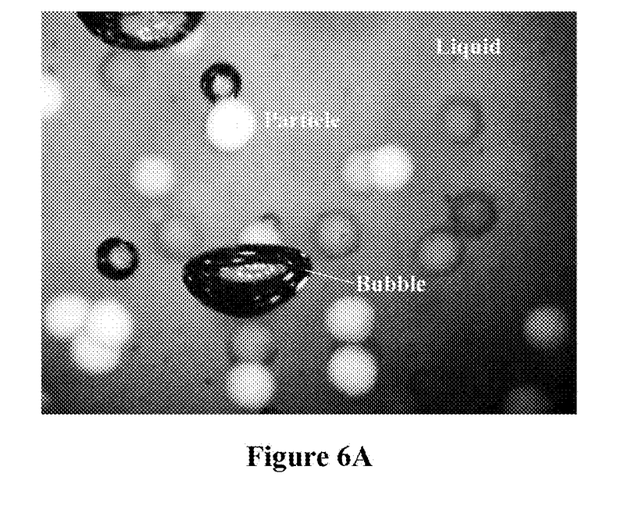
FIG. 6 is an image of the gas-liquid-solid system captured by the immersion-type online multiphase measuring instrument, where (a) the instantaneous image at the measuring point; (b) the results of the solid particle diameter measurement; and (c) the results of the bubble diameter measurement.
Figure 6B:
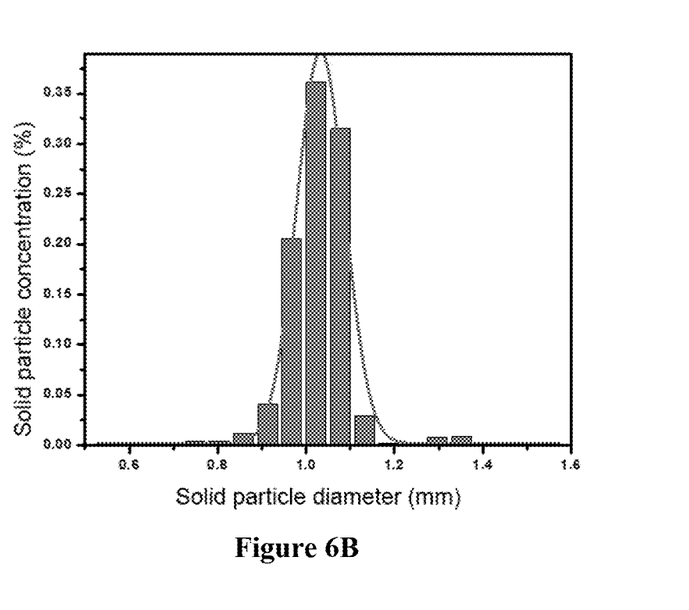
Figure 6C:
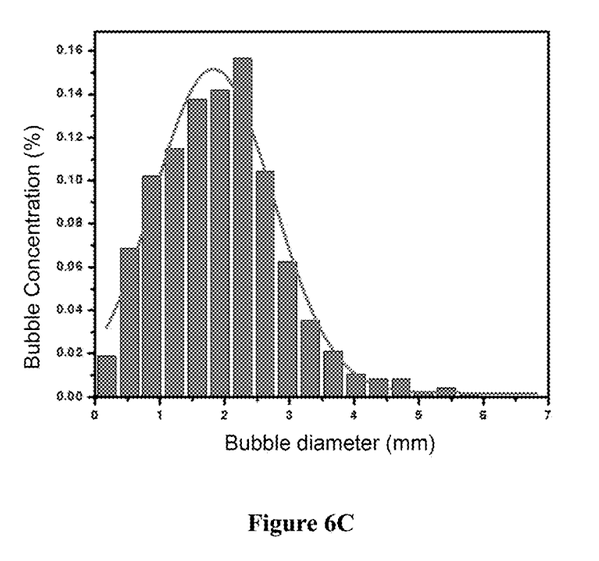

The measuring method comprises the following steps:

(1) the online multiphase measuring instrument is arranged in the gas-liquid-solid system, and an image is obtained as shown in FIG. 6-(a);

(2) valid particles are determined using the following steps:

First, the focal plane position of the telecentric lens is determined: a graduated ruler with an accuracy of 0.1 mm is placed in the same medium with the system; the medium is photographed using the online multiphase measuring instrument, the distance between the graduated ruler and the online multiphase measuring instrument is adjusted and the clarity of the graduated ruler in the photograph is observed; the position where the graduated ruler is clearest is the focal plane position;

then, the object to be measured is respectively arranged on the front of the package tube, the l/2 positions ahead of or behind the focal plane, where l is the telecentric lens depth of field (mm); the object to be measured is photographed by the online multiphase measuring instrument, and the image of the object is obtained and the gray gradient Grad($\Phi$l/2) around the boundary of the object is determined, where $\Phi_{l/2}$ is the gray value at the ±l/2 positions ahead of or behind the focal plane; if Grad($\Phi$) is greater than or equal to Grad($\Phi_{l/2}$), the particle is labeled as a valid one; and (3) a graduated ruler with an accuracy of at least 0.1 mm is arranged on the front of the online multiphase measuring instrument; then its image is captured; the number of pixels $N_{10}$ corresponding to 10 mm distance in the graduated ruler is picked up by an image processing software so as to determine the actual length of individual pixel; and the number of pixels occupied by the valid particle is measured;

the diameter of the valid particle is calculated by $d_i=10 \times n_i/N_{10}$, where $d_i$ is the particle diameter (mm); $n_i$ is the number of pixels occupied by the valid particle; $N_{10}$ is the number of pixels occupied by the 10 mm-long scale in the graduated rule;

according to the equation $$\alpha = \frac{V_c}{V} = \frac{\sum_i^n \frac{1}{6}\pi d_i^3}{S \times l},$$

the concentration of the valid particles is calculated, where S is the effective area of the photosensitive area of the image sensor (mm$^2$); l is the lens depth of field (mm); $d_i$ is the particle diameter (mm); $V_c$ is the total volume of the valid particles, V is the volume of the measured area; n is the number of the valid particles.

The solid particles and bubble diameter distributions at the measuring point are gained by processing the image, and the results are shown in FIGS. 6-(b) and 6-(c). The diameter of solid particles is in the range of 0.9-1.1 mm, and that of the bubbles is in the range of 0.5-2.8 mm. The holdups of bubbles and solid particles at this point are 0.016 and 0.0115, respectively.

The above are only specific examples of the present invention but the present invention is not limited thereto. Those skilled in the art to which the present invention belongs should appreciate that any change or replacement which can be easily thought by those skilled in the art within the technical scope disclosed by the present invention all fall into the scope protected and disclosed by the present invention.

The invention claimed is:

1. An immersion-type online multiphase measuring instrument comprising:
    a package tube;
    a viewport, sealedly installed at a front end of the package tube;
    an illumination system for illuminating multiphase flow, including LED lamps and a brightness-adjustable light source connected with the LED lamps, which comprises a power supply, a signal generator and an oscilloscope;
    a photographic system for taking pictures, including a telecentric lens and an image sensor;
    a controller connected with the signal generator and the image sensor;
    a signal processing and outputting system connected with the image sensor; and
    a display system connected with the signal processing and outputting system,
    wherein the LED lamps, the telecentric lens and the image sensor are located in the package tube,
    wherein the image sensor and the LED lamps are configured to work synchronously, and an exposure period of the image sensor is greater than twice of a pulse period of the signal generator, such that the image sensor captures a double-exposure image,
    wherein the LED lamps are configured to be below a surface of the multiphase flow, and are evenly and circularly arranged in the package tube.

2. The online multiphase measuring instrument according to claim 1, wherein the work distance of the telecentric lens is 250-550 mm, and a depth of field is 1-3.7 mm.

3. The online multiphase measuring instrument according to claim 1, wherein a magnification of the telecentric lens is 0.5-1 times.

4. The online multiphase measuring instrument according to claim 1, wherein an external diameter of the telecentric lens is 19-25 mm.

5. The online multiphase measuring instrument according to claim 1, wherein the image sensor is a CCD camera or a CMOS camera.

6. The online multiphase measuring instrument according to claim 5, wherein the exposure time of the CCD camera or CMOS camera is less than or equal to 1 ms, and a resolution is 5-15 μm; the number of pixels in length and width is at least 800×600, and a frame frequency is at least 60 fps.

7. The online multiphase measuring instrument according to claim 1, wherein the number of the LED lamps is at least 12.

8. The online multiphase measuring instrument according to claim 1, wherein the LED lamps are linked with the brightness-adjustable light source by a wire.

9. The online multiphase measuring instrument according to claim 1, wherein the package tube is composed of a front tube and a back tube with different diameters.

10. The online multiphase measuring instrument according to claim 9, wherein an external diameter of the front tube is 25-30 mm, and a length is 300-600 mm.

11. The online multiphase measuring instrument according to claim 9, wherein an external diameter of the back tube is 50 mm, and a length is 50 mm.

12. The online multiphase measuring instrument according to claim 1, wherein the material of the packaged tube is stainless steel.

13. The online multiphase measuring instrument according to claim 9, wherein the viewport, the LED lamps and the telecentric lens are packaged in the front tube; the viewport is arranged on an end of the front tube away from the back tube, followed by the LED lamps and telecentric lens; and the image sensor is packaged in the back tube.

14. The online multiphase measuring instrument according to claim 1, wherein the viewport is made up of a piece of circular glass coated by an antireflection film.

15. The online multiphase measuring instrument according to claim 1, wherein the image sensor and the signal generator are connected to the controller by a high-speed data wire.

16. The online multiphase measuring instrument according to claim 1, wherein the display system comprises an LED screen.

17. The online multiphase measuring instrument according to claim 1, wherein the signal processing and outputting system, the controller and the display system are integrated into a computer.

18. A method of using the immersion-type online multiphase measuring instrument according to claim 1 for measuring the state of multiphase flow, comprising: the immersion-type online multiphase measuring instrument is arranged in a multiphase flow reactor; then photography is conducted using the illumination system and the photographic system synchronously to obtain image information of local flow in the multiphase flow reactor; and last, the image information is analyzed using an image analysis software and state information of the multiphase flow at the front face of an immersion-type online multiphase measuring instrument is obtained.

* * * * *